July 25, 1961 J. E. COLLINS 2,993,510
FLUID CONTROL VALVE
Filed Nov. 28, 1956 2 Sheets-Sheet 1

INVENTOR.
JOHN E. COLLINS
BY
Bates, Teare & McBean
ATTORNEYS

INVENTOR.
JOHN E. COLLINS
BY
Bates Peare & McBean
ATTORNEYS

United States Patent Office 2,993,510
Patented July 25, 1961

2,993,510
FLUID CONTROL VALVE
John E. Collins, Akron, Ohio, assignor, by mesne assignments to International Basic Economy Corporation, New York, N.Y., a corporation of New York
Filed Nov. 28, 1956, Ser. No. 624,796
8 Claims. (Cl. 137—622)

This invention relates to valves and more particularly to valves which are used for controlling the flow of fluid in gaseous or liquid systems.

It is an object of the present invention to provide a plunger control valve wherein the speed of operation of the main plunger is substantially increased.

Another object of the present invention is to provide a plunger control valve wherein movement of the main plunger to each end of its stroke is positive in action and wherein the plunger is held at either end of its stroke by a positive force of pressurized fluid inside of the valve direct from the fluid source of supply.

A further object of the present invention is to provide a plunger control valve triggered by a single solenoid-operated pilot control member requiring only momentary energization to effect plunger displacement in either direction.

Other objects and advantages of the invention will become apparent from the following description of one preferred valve mechanism embodying this invention and which is shown in the drawings in which.

Figure 1:
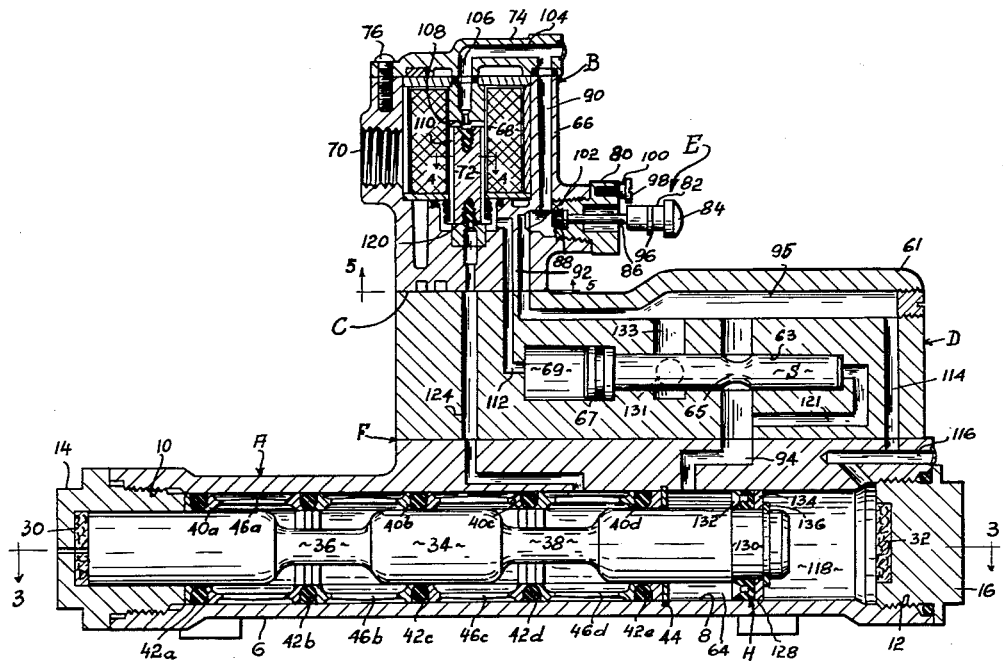
FIG. 1 is a vertical sectional view through a plunger valve and pilot control arrangement constructed in accordance with the present invention.
Figure 4:
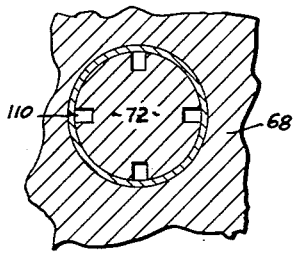
FIG. 4 is an enlarged horizontal sectional view taken along the line 4—4 of FIG. 1.
Figure 5:
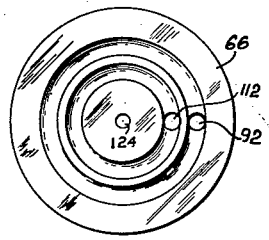
FIG. 5 is an enlarged horizontal sectional view taken along the line 5—5 of FIG. 1.

The valve illustrated is one which is adapted for use in controlling the flow of fluid under pressure from a source of supply to one or more outlet conduits. The mechanism is triggered by a single solenoid pilot control member, which may be remotely controlled by an operator. Although the valve in the present instance takes the form of a plunger type four-way fluid valve, the valve may be a two-way, three-way or any other type of plunger operated fluid valve.

Referring to the drawings, there is shown a plunger valve A which is directly actuated or triggered by an auxiliary plunger valve D, which, in turn, is triggered by solenoid-operated pilot control valve B. The housings for the valves B and D have complementary meeting faces on the parting line C, and the housings for the valves A and D have complementary meeting faces on the parting line F. However, the valves A and D may be contained in the same housing, if desired.

The plunger valve A comprises a housing or manifold 6 having a longitudinal cylindrical bore 8, which has the threaded openings 10 and 12 at each end thereof into which the end plugs 14 and 16 respectively may be threaded. The inner faces of the end plugs 14 and 16 carry the resilient shock pads 30 and 32 respectively for reducing the shock of the main plunger 34 as it reciprocates in the bore 8.

Within the bore 8 there is the aforementioned reciprocable plunger 34, which is necked-down at two locations 36 and 38, the purpose of this reduction in diameter being to permit cross communication between certain ports in the housing 6 as will be hereinafter explained. The plunger may float within suitable spacing and packing members comprising in this instance, a series of spacer rings 40a (FIG. 1), 40b, 40c, and 40d and intermediate packing rings 42a, 42b, 42c, 42d and 42e respectively. The ring 42a is disposed between the spacer 40a and the end plug 14, and the ring 42e is disposed between the spacer 40d and the snap ring 44. The packer-spacer assembly so far described is fixed in position and the plunger 34 is freely movable therewithin.

The spacers are provided with peripherally disposed apertures (shown for example at 46a, 46b, 46c and 46d), which permit free passage of pressurized fluid (liquid or gaseous) in cross communication with predetermined ports in the housing 6 as permitted by the cyclic plunger positions.

The housing 6 contains a fluid manifold including a series of ports and passageways now to be described. Situated at an intermediate point on the housing 6, is an inlet passageway 48 (FIG. 3), which receives pressurized fluid from an inlet port 50 connected to an external source of fluid supply (not shown) and transmits it through the branch passageways 48a and 48b to the opposite ends respectively of the bore 8. On the opposite side of the housing 6 there is a centrally disposed exhaust port 52 situated between two cylinder feed ports 54 and 56, which, through the respective pipes 58 and 60, serve two working cylinders or two ends of a double acting cylinder (not shown).

Figure 3:
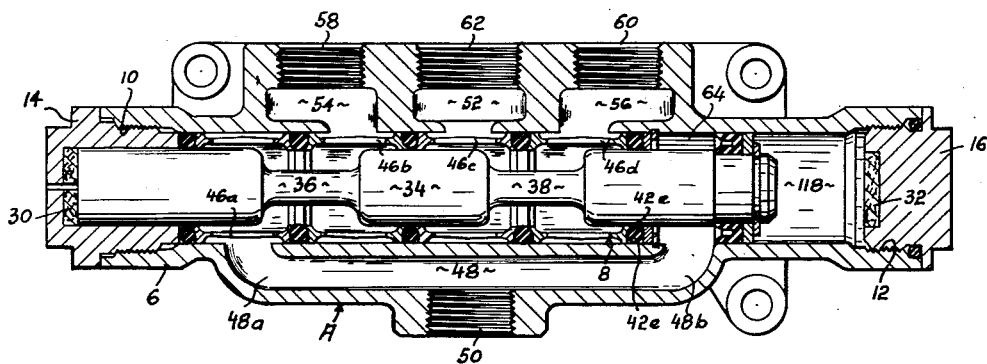
FIG. 3 is a horizontal sectional view taken along the line 3—3 of FIG. 1.

When the plunger 34 is in the position shown in FIG. 3, pressurized fluid may be passed from the inlet passageway 48, through the branch passageway 48a, through spacer apertures 46a, around the plunger necked-down portion 36, through the aperture 46b, into the port 54 and through the pipe 58 to a power cylinder. At the same time, the other cylinder or the other end of a double acting cylinder is open to exhaust through the pipe 60 and the port 56, through aperture 46d, past the plunger necked-down portion 38, through the aperture 46c, into the port 52 and out the exhaust pipe 62. The inlet branch passageway 48b feeds pressurized fluid to the right end of the bore 8, but this fluid cannot pass to the left by reason of the packing ring 42e. When the plunger moves to the right end of the bore, the pipe 58 will be open to exhaust and the pipe 60 will receive pressurized fluid from the inlet port 50 past the necked-down portion 38 of the plunger.

Reciprocation of the main plunger 34 is controlled by an auxiliary plunger or sliding spool S (FIGS. 1 and 2), which is reciprocably disposed in the bore 63 in the auxiliary housing 61. The housing 61 may be formed integral with the housing 6 or it may be separately formed and secured to the housing 6 by any suitable means. The auxiliary plunger S has a necked-down portion 65, over which pressurized fluid is allowed to pass to control reciprocation of the main plunger. The auxiliary plunger has a head 67 at the left end thereof disposed in an enlarged portion 69 of the bore 63. Pressurized fluid acts against the left end of the head 67 and against the opposite end of the auxiliary plunger S in a predetermined manner to reciprocate the same, said reciprocation of the auxiliary plunger, in turn, controlling the reciprocation of the main plunger 34 as will be hereinafter explained.

Reciprocation of the auxiliary plunger is controlled by the solenoid-operated pilot control member B, the operation of which will now be described. The valve B (FIGS. 1 and 2), comprises a body or housing 66 in which is fixed a solenoid coil 68, which is in accessible communication with the junction box portion 70 of the body.

Within the solenoid coil an armature 72 is vertically reciprocable, responsive of course to energization or de-energization of the solenoid coil 68 by any suitable timer device. A cap 74 is retained on top of the housing 66 by the cap screws 76. Disposed in the side of the valve housing 66 is a manual override valve E having a body 80 and a control plunger or valve 82 operated by a button 84. The plunger 82 forms into a stem 86, which carries a valve head 88. The valve E is shown in its open or unseated position (this being the normal position of the valve), whereby fluid is permitted to flow between passageways 90 and 92. To seat the valve, the plunger 82 may be moved to the left until the head 88 engages the valve seat 102. Once the valve is in its seated position, the stem 86 may be rotated and a cut-away portion of the flange 96 thereon can pass the head 98 of the stem 100, which is fixed in the body 80 so that the override valve cannot be drawn to the right thus locking the valve in its seated position.

The plunger 34 is provided with a piston or packing head H, which is disposed for reciprocation in a bore portion 64 defining a chamber 118. The head H has a U-shaped packer ring 128 disposed on the end portion 130 of the plunger, which is of a reduced diameter. The ring 128 is maintained in operating position on the end portion 130 by a spreader ring 132. The packer ring 128 is retained at its other end by a washer 134 and a snap ring 136 in a groove in the end portion 130.

The plunger 34 is reciprocated in the bore 8 by admitting and discharging pressurized fluid to and from the chamber 118, wherein the fluid acts on the right end (FIG. 1) of the plunger head H. Pressurized fluid is always maintained on the left side of the head H, since the bore portion 64 is in direct communication with the inlet branch passageway 48b (thus forcing the plunger to the right when the chamber 118 is exhausted). When the pressurized fluid is admitted to the chamber 118, the plunger moves to the left because the right end of the head H has a greater cross sectional area than the left end of the head. Reciprocation of the plunger is thus responsive to the admittance and discharge of pressurized fluid to and from the chamber 118, which is controlled by the cyclic positions of the auxiliary plunger S, which in turn is controlled by the energization and de-energization of the solenoid coil 68 as aforedescribed.

Operation of the main plunger valve A will now be described. Assuming that the armature 72 of the pilot control valve B is in its lower or de-energized position, that the override valve E is open and that the plunger 34 is in its left end position in the bore 8, all of such conditions being shown in FIG. 1, fluid pressure may flow from the inlet port 50 (FIG. 3), through the inlet passageway 48 and branch passageway 48b, through the passageway 94 (FIG. 1), past the necked-down portion 65 of the auxiliary plunger and into the passageway 95. From the passageway 95, the pressurized fluid may flow down the passageway 114, through the passageway 116 and into the chamber 118 in the bore 8, thereby applying pressurized fluid against the right end of the main plunger 34 and holding it in its left end position in the bore 8 as shown in FIG. 1. The pressurized fluid in the passageway 95 also flows through the passageway 92 (of the override valve E), past the open valve head 88, up the passageway 90, through the passageway 104, down the passageway 106, past the open pilot valve head 108, through the slots 110 in the armature side, through the passageway 112 and into the enlarged portion 69 of the auxiliary bore 63, wherein the pressurized fluid acts against the head 67 of the auxiliary plunger S to force the plunger to its right end position in the bore 63 (FIG. 1). Although pressurized fluid is also acting against the right end of the auxiliary plunger through the passageway 121, the plunger is retained in its right end position in the bore because of the greater cross-sectional area of the left end of the plunger.

Figure 2:
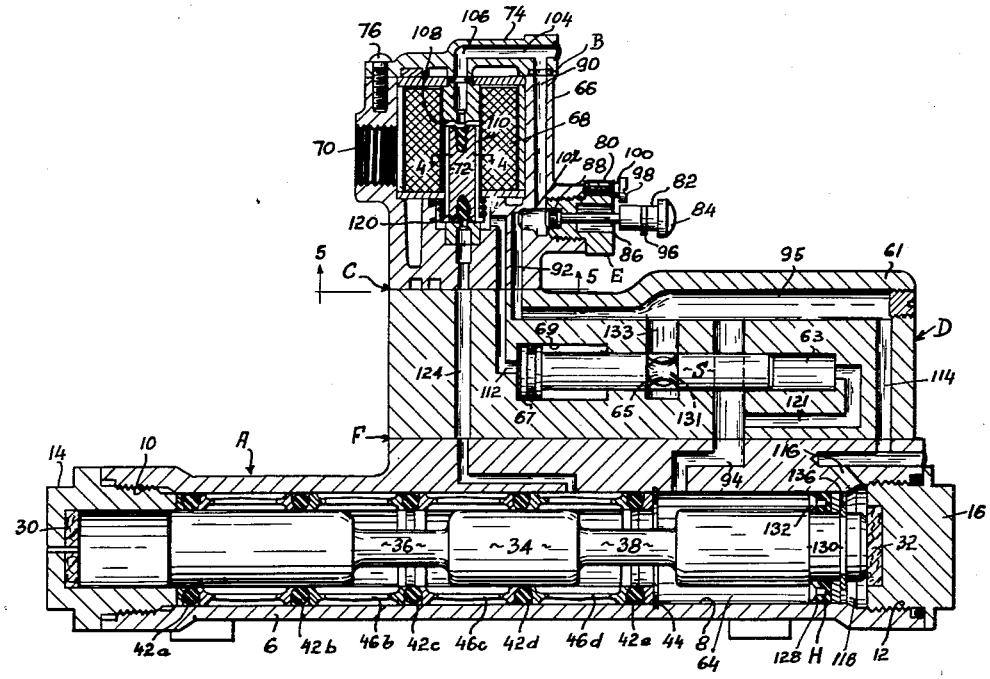
FIG. 2 is a vertical sectional view similar to FIG. 1, but showing the main plunger in its right end position in the housing and showing the auxiliary plunger in its left end position in the valve housing.

When the armature 72 is momentarily raised by the energization of the coil 68, the valve head 108 at the upper end of the armature is closed thus terminating fluid flow thereby. At the same time, the valve head 120 at the lower end of the armature is opened and the pressurized fluid in the auxiliary chamber 69 (FIG. 1) may now exhaust up the passageway 112, past the open valve head 120 (FIG. 2), down the passageway 124, past the apertures 46d and the necked-down portion 38 of the main plunger and out the exhaust port 52 (FIG. 3). When the auxiliary chamber 69 is thus exhausted, the auxiliary plunger S moves to its left end position in the bore 63, thereby terminating the fluid flow up passageway 94 (FIG. 2) to the passageway 95. When the auxiliary plunger S reaches its left end position in its bore 63 as shown in FIG. 2, the necked-down portion 65 thereon opens the passageway 95 to the exhaust port 131, thereby exhausting the pressurized fluid from the chamber 118 of the main bore through the passageways 116, 114, 95, 133 and out the exhaust port 131, thereby enabling the main plunger 34 to move to its right end position in the bore 8 by reason of the constantly maintained pressure on the left end of the main plunger head H as aforedescribed. When the auxiliary plunger is in its left end position in the bore, pressurized fluid enters the passageway 94 and flows through the passageway 121 to the right end of the auxiliary plunger S, thereby maintaining the same in its left end position. Although pressurized fluid may now flow up the passageway 124, the fluid cannot pass beyond the valve head 120 at the lower end of the armature 72, by reason of the fact that the solenoid pilot valve B was only momentarily energized, the lower valve head 120 now being closed. Additionally, when the auxiliary plunger is in its left end position, the chamber 69 at the left end of the auxiliary bore may now be exhausted through the passageway 112, through the armature slots 110, past the open valve head 108, up the passageway 106, through the passageway 104, down the passageway 90, past the open override valve seat 102, down the passageway 92, into the passageway 95, down the passageway 133 and out the exhaust port 131.

If the electric current is cut off unexpectedly or if it is desired to manually control just a few cycles of operation, for instance, in setting up and checking an assembly, the main plunger 34 may be controlled by manual operation of the override valve E without energization of the control solenoid coil 68. It is assumed that fluid under pressure is supplied to the plunger valve A as heretofore described, that the override valve E is in its normal or open position, that the auxiliary plunger S is in its right end position in the bore 63, and that the armature 72 is in its lower or de-energized position. The plunger 34 will be in its left hand position as shown in FIG. 1. When it is desired to have the plunger 34 moved to its right hand position, the override valve E is manually closed. This stops the flow of pressurized fluid to the auxiliary chamber 69 and permits the pressurized fluid therein to be relieved by flowing through the passageway 112, through the armature slots 110, past the open valve head 108, through the passageways 106, 104 and 90, and escaping to the exterior of the structure by passing along the stem 86 and the plunger 82 to the exterior of the body 80, said stem and plunger having a loose fit with said body. The relief of pressure in the chamber 69 results in the movement of the auxiliary plunger S to the left end of its bore 63, thereby permitting the pressurized fluid from the inlet passageway 48 to flow through the passageways 94 and 121 and to act on the right end of the auxiliary plunger and maintain the same in its left end position in the bore 63. When this is done, the flow of pressurized fluid to the chamber 118 is cut off as aforedescribed, with the result that the main plunger 34 will move to its right end position in its bore as heretofore described in connection with the normal operation. After the main plunger 34 has moved to its right end position, it may be returned to its left end position by manually opening the override valve. When such valve is opened, leakage of the pressurized fluid along the stem 86 and the plunger 82 is prevented by engagement of the valve head 88 with the seat provided in the body 80 between its reduced diameter portion and the passageway 90. This cyclic procedure may be repeated as often as desired.

Various modifications are possible within the scope of the invention claimed.

I claim:

1. Valve mechanism comprising a main valve body having a main valve member reciprocative therein for controlling fluid flow, said main valve member having opposing differential area pressure-responsive actuating surfaces the smaller of which is adapted for continuous communication with a pressure source, an auxiliary valve including a valve member reciprocative to one position for selectively communicating fluid pressure to the larger of said actuating surfaces of said main valve member and to another position for communicating said larger surface to exhaust, said auxiliary valve member having opposing differential area pressure responsive actuating surfaces the smaller of which is in continuous communication with the smaller actuating surface of said main valve member, and a pilot valve for selectively communicating the larger actuating surface of said auxiliary valve member with a pressure source and with exhaust to effect reciprocation of said auxiliary valve member.

2. Valve mechanism comprising a main valve body having a main valve member reciprocative therein for controlling fluid flow, and means for biasing said main valve member toward a first position in said main body; an actuating surface on said main valve member responsive to pressure to overcome said bias means and displace said main valve member toward a second position in said main body; an auxiliary valve including an auxiliary valve member reciprocable to selectively communicate pressure to and exhaust pressure from communication with said actuating surface of said main valve member; means for biasing said auxiliary valve member toward one of said positions in which said actuating surface of said main valve member is communicated to exhaust, said auxiliary valve member having an actuating surface responsive to pressure to displace said auxiliary valve member against its biasing means to a position in which the auxiliary valve member communicates pressure to said actuating surface of said main valve member; and a pilot valve for selectively communicating fluid pressure to and exhausting it from said actuating surface of said auxiliary valve member.

3. Valve mechanism comprising a main valve plunger reciprocable in a casing for fluid flow control in the casing, said plunger having opposing differential-area actuating surfaces thereon the smaller of which is adapted for continuous communication with a fluid pressure source; an auxiliary valve comprising a pressure port, an exhaust port, and a valve member reciprocable in said casing between (1) a first position wherein said auxiliary pressure port is communicated to the larger actuating surface of said plunger, and (2) a second position wherein said auxiliary exhaust port is communicated to the larger plunger actuating surface; said auxiliary valve member further having opposing differential area actuating surfaces, and means intercommunicating the two smaller actuating surfaces of said auxiliary valve member and said plunger in either of said positions of said auxiliary valve member; an electromagnetic pilot valve having a normally de-energized position in which said pilot valve intercommunicates said larger actuating surfaces of said auxiliary valve member and said plunger in either of said positions of said auxiliary valve member; and a passage in the casing to which the larger surface of said auxiliary valve member is communicated when said pilot valve is energized, said passage in turn communicating with (1) a region of said plunger casing from which pressure is exhausted when said auxiliary member is in said first position, and (2) a region of said plunger casing which is pressurized when said auxiliary member is displaced to said second position.

4. In combination with a plunger valve in which the plunger is reciprocable in a casing in response to fluid pressure on an actuating surface on the plunger against a biasing means acting on the plunger, and a pilot valve for triggering the reciprocation of said plunger, the improvement comprising an auxiliary valve having a pressure port, an exhaust port, and a valve member movable between two positions to selectively communicate one and then the other of said ports with said plunger actuating surface to reciprocate the plunger; means for biasing said auxiliary valve member to a position for communicating one of said ports to said plunger actuating surface, and said auxiliary valve member having a pressure-responsive actuating surface for displacing said valve member against its bias to bring the other of said ports into communication with the plunger actuating surface; said pilot valve having a normally de-actuated position in which said actuating surface of said plunger and said actuating surface of said auxiliary valve member are intercommunicated in either of said positions of said auxiliary valve member; and means operable when said pilot valve is actuated for communicating the actuating surface of said auxiliary valve member to a region of the plunger valve which is then under pressure conditions opposite to that to which the plunger actuating surface is then subjected by its then communication with an auxiliary valve port.

5. In combination, a fluid actuated differential area type main plunger valve including a housing having a bore and a plurality of ports therein in communication with the bore and having a plunger reciprocably disposed in said bore, said plunger having spaced, necked-down portions to permit the flow of fluid between certain of said ports when the plunger is reciprocated to predetermined positions in the bore, a fluid actuated differential area type auxiliary plunger valve including a housing having a bore and a plurality of passageways in communication with said first and second-named bores and having an auxiliary plunger reciprocably disposed in said second-named bore, said plunger having at least one necked-down portion for controlling the flow of fluid between certain of said passageways when the auxiliary plunger is reciprocated to predetermined positions in the second-named bore, thereby actuating said first-named plunger, and a pilot control valve having solenoid energized means for controlling the flow of fluid that actuates said auxiliary plunger valve.

6. The combination of claim 5 wherein said pilot control valve has a manually operated override valve for controlling the flow of fluid that acutates said auxiliary plunger valve independently of the energization of said solenoid energized means.

7. A differential area type valve including a housing having an elongated bore therein closed at its ends, said bore having an enlarged chamber at one end thereof having a longitudinal wall, said housing having a plurality of ports extending between the bore and the exterior of the housing, a differential area type plunger of lesser length than said bore disposed in the bore for reciprocation therein, means on said plunger to permit pressurized fluid to flow between predetermined ports when said plunger is reciprocated to predetermined positions in said bore, said plunger having a fluid pressure retaining head at one end thereof disposed in said chamber in fluid-tight contact with said longitudinal wall, said head having an area for exposure to fluid pressure on its end nearest the adjacent end of the bore greater than the area at its other end which is exposed to fluid pressure, means for maintaining pressurized fluids on said other end of said head to bias said plunger toward said adjacent end of the bore, an auxiliary differential area type plunger valve for controlling the flow of pressurized fluid to and from said first-named end of said head to reciprocate said plunger, and a solenoid operated control valve for triggering said auxiliary plunger valve.

8. A differential area type plunger valve including a housing having a bore therein and closed at its ends, one end of the bore terminating in an enlarged chamber having a longitudinal wall, said housing having a plurality of ports extending between said bore and the exterior of said housing, a differential area type plunger of lesser length than said bore disposed in the bore for reciprocation therein, means on said plunger to permit pressurized fluid to flow between predetermined ports when said plunger is reciprocated to predetermined positions in said bore, said plunger having a fluid pressure retaining head at one end thereof disposed in said chamber in fluid-tight contact with said longitudinal wall, said head having an area for exposure to fluid pressure on its end nearest the adjacent end of the bore greater than the area at its other end which is exposed to fluid pressure, means for maintaining pressurized fluid on said other end of said head to bias said plunger towards said adjacent end of the bore, an auxiliary differential type valve disposed on said housing, said housing and said auxiliary plunger valve including a passageway through which pressurized fluid may flow from a source to said first-named end of said head, said auxiliary plunger valve having a bore intersecting said passageway, a differential area type plunger reciprocably disposed in said second-named bore and having at least one necked-down portion for controlling the flow of pressurized fluid through said passageway when said second-named plunger is disposed at a predetermined position in said second-named bore, and a solenoid operated pilot control valve for triggering said auxiliary plunger valve.

References Cited in the file of this patent

UNITED STATES PATENTS

| | | |
|---|---|---|
| 412,327 | Gibson | Oct. 8, 1889 |
| 446,836 | Matthews | Feb. 17, 1891 |
| 560,230 | Powers | May 19, 1896 |
| 786,653 | Larsson | Apr. 4, 1905 |
| 2,582,088 | Walthers | Jan. 8, 1952 |
| 2,598,180 | Kenyon | May 27, 1952 |
| 2,608,995 | Gardner | Sept. 2, 1952 |
| 2,611,391 | Sainsbury et al. | Sept. 23, 1952 |
| 2,616,449 | Maha | Nov. 4, 1952 |
| 2,617,444 | Gardner | Nov. 11, 1952 |
| 2,625,136 | Moog | Jan. 13, 1953 |
| 2,672,886 | Crookston | Mar. 23, 1954 |
| 2,735,342 | Glaser | Feb. 21, 1956 |
| 2,775,982 | Canfield | Jan. 1, 1957 |
| 2,832,318 | Paine | Apr. 29, 1958 |
| 2,921,602 | Brinkel | Jan. 19, 1960 |

FOREIGN PATENTS

| | | |
|---|---|---|
| 761,601 | France | Jan. 10, 1934 |
| 308,990 | Switzerland | July 20, 1951 |
| 726,379 | Great Britain | Mar. 16, 1955 |
| 742,106 | Great Britain | Dec. 21, 1955 |